United States Patent
Jin et al.

(10) Patent No.: US 8,924,991 B2
(45) Date of Patent: Dec. 30, 2014

(54) BREAKPOINT INFORMATION MANAGEMENT METHOD AND BREAKPOINT INFORMATION MANAGER

(71) Applicant: Huawei Technologies Co., Ltd., Shenzhen, Guangdong (CN)

(72) Inventors: Hongbo Jin, Shenzhen (CN); Youliang Yan, Shenzhen (CN); Wangbin Zhu, Shenzhen (CN); Zhihong Qiu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/962,820

(22) Filed: Aug. 8, 2013

(65) Prior Publication Data
US 2013/0326547 A1  Dec. 5, 2013

Related U.S. Application Data

(63) Continuation of application No. PCT/CN2011/072805, filed on Apr. 14, 2011.

(51) Int. Cl.
*G06F 9/54* (2006.01)
*G06F 11/36* (2006.01)

(52) U.S. Cl.
CPC ............ *G06F 9/541* (2013.01); *G06F 11/3636* (2013.01)
USPC .............. 719/328; 719/310; 717/125; 717/26

(58) Field of Classification Search
CPC ... G06F 3/0483; G06F 3/048; G06F 17/2247; G06F 17/241; G06F 1/1641; G06F 3/0482; G06F 11/3466; G06F 15/0291; G06F 17/212; G06F 17/2229; G06F 17/30011; G06F 17/30017; G06F 17/30056
See application file for complete search history.

(56) References Cited

U.S. PATENT DOCUMENTS 6,868,225 B1   3/2005  Brown et al.
8,079,037 B2 * 12/2011  Lui et al. ...................... 719/310

(Continued)

FOREIGN PATENT DOCUMENTS

CN   1353851 A   6/2002
CN   1991823 A   7/2007

(Continued)

OTHER PUBLICATIONS

International Search Report dated Feb. 23, 2012 in connection with International Patent Application No. PCT/CN2011/072805.

(Continued)

*Primary Examiner* — Tuan Dao

(57) ABSTRACT

Embodiments of the present invention relate to a breakpoint information management method and a breakpoint information manager. The breakpoint information management method includes: obtaining, according to a query parameter obtained from a current application program and stored breakpoint information of at least one application program, breakpoint context information corresponding to the query parameter; calculating interest information according to the breakpoint context information; and returning the interest information to the current application program so that the current application program plays a corresponding electronic file. With the breakpoint information management method and the breakpoint information manager provided in the present invention, breakpoint information is deeply analyzed to obtain interest information, so that the breakpoint information is reused; and electronic files satisfying a user's interest characteristics are played for the user according to the interest information, thereby enlarging the application scope of the breakpoint information.

7 Claims, 3 Drawing Sheets

(56) References Cited

U.S. PATENT DOCUMENTS

| | | |
|---|---|---|
| 2007/0011616 A1 | 1/2007 | Ording et al. |
| 2008/0294674 A1* | 11/2008 | Reztlaff et al. ............... 707/102 |
| 2009/0327809 A1* | 12/2009 | Joy et al. ......................... 714/26 |
| 2012/0030227 A1* | 2/2012 | Mital et al. .................... 707/767 |
| 2012/0113019 A1* | 5/2012 | Anderson ..................... 345/173 |
| 2012/0159373 A1* | 6/2012 | Archer et al. ................. 715/776 |
| 2013/0104107 A1* | 4/2013 | De Smet et al. .............. 717/125 |

FOREIGN PATENT DOCUMENTS

| | | |
|---|---|---|
| CN | 101097774 A | 1/2008 |
| CN | 101394530 A | 3/2009 |

OTHER PUBLICATIONS

Sun, Duo, "Modeling Methods of User interesting in Educationweb Personalized Recommendation System", Oct. 17, 2013, 9 pages.

* cited by examiner

BREAKPOINT INFORMATION MANAGEMENT METHOD AND BREAKPOINT INFORMATION MANAGER

CROSS-REFERENCE TO RELATED APPLICATIONS

This application is a continuation of International Application No. PCT/CN2011/072805, filed on Apr. 14, 2011, which is hereby incorporated by reference in its entirety.

TECHNICAL FIELD

Embodiments of the present invention relate to information technologies, and in particular, to a breakpoint information management method and a breakpoint information manager.

BACKGROUND

With popularity of electronic books, users' reading gradually transfers from traditional paper media to electronic media. During reading using the electronic media mode, the points where users suspend or quit reading are referred to as breakpoints, and contents related to the breakpoints are referred to as breakpoint contexts. To facilitate users' memorization and next-time reading, a bookmark function is provided in an electronic book player for users to mark the breakpoints when the users suspend or quit reading.

Currently, with the increase of various formats of electronic files, players only used for the users to read the electronic books do not satisfy users' requirements. Players integrating a plurality of application programs and capable of playing electronic files in various formats are gaining popularity, for example, mobile phones and tablet computers capable of playing electronic files such as pictures, audios, videos, and electronic books.

In a player integrating a plurality of application programs, the bookmark function in the electronic book player can be used for files in the electronic format. The bookmark function adopts a manner of saving the page or page number of a breakpoint. This manner is only applicable to internal markup of an electronic book program, and is not applicable to playing of files in other formats. In addition, the breakpoint information saved by using the bookmark function is only used to continue reading of an electronic book from the breakpoint when the electronic book is played again, and the breakpoint information is not deeply analyzed and used. In conclusion, with the existing breakpoint information management method, the application scope of the breakpoint information is limited.

SUMMARY

Embodiments of the present invention provide a breakpoint information management method to overcome the defect in the prior art and enlarge the application scope of the breakpoint information.

Embodiments of the present invention further provide a breakpoint information manager to overcome the defect in the prior art and enlarge the application scope of the breakpoint information.

An embodiment of the present invention provides a breakpoint information management method, including:

obtaining, according to a query parameter obtained from a current application program and stored breakpoint information of at least one application program, breakpoint context information corresponding to the query parameter;

calculating interest information according to the breakpoint context information; and returning the interest information to the current application program so that the current application program plays a corresponding electronic file.

An embodiment of the present invention provides a breakpoint information manager, including:

a breakpoint information base, configured to store breakpoint information of at least one application program;

a breakpoint querying module, configured to obtain, according to a query parameter obtained from a current application program and stored breakpoint information of at least one application program, breakpoint context information corresponding to the query parameter;

an interest information calculating module, configured to calculate interest information according to the breakpoint context information; and a returning module, configured to return the interest information to the current application program so that the current application program plays a corresponding electronic file.

It can be known from the above technical solutions that, in the embodiments of the present invention, after breakpoint information of at least one application program is obtained, a query parameter is obtained from a current application program, corresponding breakpoint context information is obtained from the stored breakpoint information according to the query parameter, and interest information is calculated according to the breakpoint context information and returned to a current application program so that the current application program plays a corresponding electronic file according to the interest information. Hence the breakpoint information is deeply analyzed to obtain the interest information, and the breakpoint information is reused; and electronic files satisfying a user's interest characteristics are played for the user according to the interest information, thereby enlarging the application scope of the breakpoint information.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following descriptions show merely some embodiments of the present invention, and persons of ordinary skill in the art may still derive other drawings from the accompanying drawings without creative efforts.

DETAILED DESCRIPTION

The following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
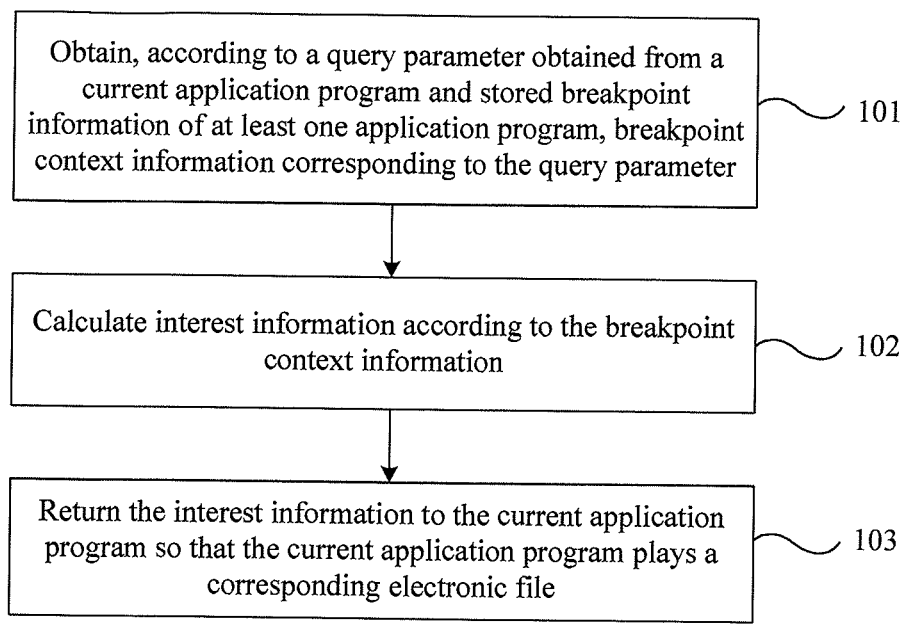
FIG. 1 is a flowchart of a breakpoint information management method according to a first embodiment of the present invention.

FIG. 1 is a flowchart of a breakpoint information management method according to a first embodiment of the present invention. As shown in FIG. 1, the method includes the following steps Step 101: Obtain, according to a query parameter obtained from a current application program and stored breakpoint information of at least one application program, breakpoint context information corresponding to the query parameter.

Step 102: Calculate interest information according to the breakpoint context information.

Step 103: Return the interest information to the current application program so that the current application program plays a corresponding electronic file.

In the first embodiment of the present invention, after the breakpoint information of at least one application program is obtained, the corresponding breakpoint context may be obtained by using the query parameter, the interest information may be calculated according to the breakpoint context, and the corresponding electronic file may be played according to the interest information. Hence the breakpoint information is deeply analyzed and reused; and electronic files satisfying a user's interest characteristics are played for the user according to the interest information, thereby enlarging the application scope of the breakpoint information.

Figure 2:
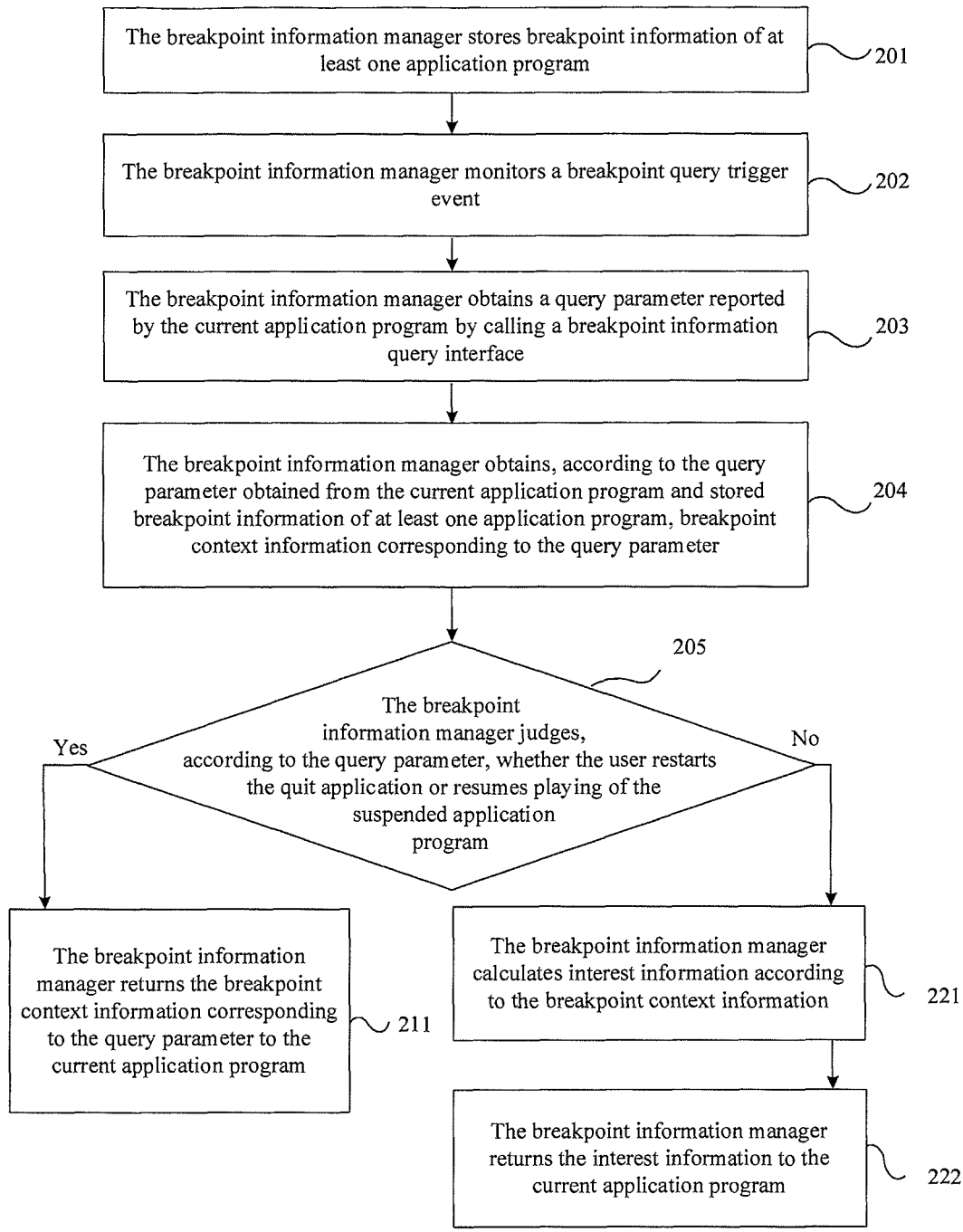
FIG. 2 is a flowchart of a breakpoint information management method according to a second embodiment of the present invention.

FIG. 2 is a flowchart of a breakpoint information management method according to a second embodiment of the present invention. In a practical application, a breakpoint information manager may perform the process of the method. As shown in FIG. 2, the method includes the following process:

Step 201: The breakpoint information manager stores breakpoint information of at least one application program.

In this step, the breakpoint information includes breakpoint context information, and further includes at least one of the following information: a device identifier, a user identifier, and an application program identifier. Further, the breakpoint information may include information such as breakpoint time information.

Step 201 may be implemented in the following three manners:

Manner 1: The breakpoint information manager obtains and stores the breakpoint information reported by the at least one application program by calling a breakpoint information saving interface when the at least one application program is suspended or quit. Using this manner, the breakpoint information manager includes a breakpoint information saving interface, and is connected to a plurality of application programs by using the breakpoint information saving interface. For a plurality of application programs, when an application program is suspended or quit, the application program calls the breakpoint information saving interface and reports the breakpoint information of the application program to the breakpoint information manager by using the interface. The breakpoint information manager stores the breakpoint information after obtaining the breakpoint information. Specifically, the breakpoint information saving interface may be an application programming interface (Application Programming Interface, abbreviated as API). One example of the breakpoint information saving interface is pushBreakPointContext (the device identifier, the user identifier, the application program identifier, and the breakpoint context information).

Manner 2: When monitoring that the at least one application program is suspended or quit, the breakpoint information manager captures screen page information by using a screen-capture operation interface, and obtains and stores the breakpoint information of the at least one application program according to the screen page information. Using this manner, the breakpoint information manager includes the screen-capture operation interface, and is connected to a plurality of application programs by using the screen-capture operation interface. The breakpoint information manager monitors the plurality of application programs, and when monitoring that there is an application program which is suspended or quit, captures current screen page information by using the screen-capture operation interface, and obtains and stores the breakpoint information of the application program according to the screen page information. Specifically, after capturing the current screen page information, the breakpoint information manager processes the current screen page information. One preferred implementation manner is to process the current screen page information by using a vector space model (Vector Space Model, abbreviated as VSM) and represent the breakpoint context information in the form of a vectorization and take the obtained vector as the breakpoint information.

Manner 3: The breakpoint information manager obtains and stores the breakpoint information of the at least one application program from a storage device. This manner is mainly applicable to the scenario of resetting the breakpoint information manager. Using this manner, the breakpoint information stored in the breakpoint information manager is backed up to the storage device in advance; after the breakpoint information manager is reset, the backup breakpoint information is obtained from the storage device and stored.

Using a widget (widget) system as an example, the breakpoint information manager may be deployed in a widget engine client as a module, to enhance information sharing between application programs of the widget. The widget engine is capable of monitoring running of an application program of the widget. When it is determined that a breakpoint occurs, the application program calls the breakpoint information saving interface to report its breakpoint information. Or, when it is determined that a breakpoint occurs, the breakpoint information manager performs a screen-capture operation for the current application program to obtain the breakpoint context information. The breakpoint context information includes but is not limited to: text content, network connection, network quality of service (Quality of Service, abbreviated to QoS), and network configuration and the like.

Step 202: The breakpoint information manager monitors a breakpoint query trigger event.

In this step, the breakpoint query trigger event may include: starting a new application program by a user, or restarting the quit application program by the user, or resuming playing of the suspended application by the user. The event is a trigger event for starting the breakpoint query process. The breakpoint information manager starts to perform step 203 after monitoring the event.

Or, step 202 is not required. The breakpoint information manager may not need to be triggered by any event. Instead, the breakpoint information manager starts to perform step 203 at anytime after step 201 is performed.

Step 203: The breakpoint information manager obtains a query parameter reported by the current application program by calling a breakpoint information query interface.

In this step, the query parameter includes at least one of the following information: the device identifier, the user identifier, and the application program identifier. Further, the query parameter may further include information such as the breakpoint time information.

Specifically, the breakpoint information manager includes a breakpoint information query interface, and is connected to a plurality of application programs by using the breakpoint information query interface. The breakpoint information query interface may be an API. The application program connected to the breakpoint information manager includes an API code for calling the breakpoint information query interface. If running the API code, the current program reports the query parameter to the breakpoint information manager by calling the breakpoint information query interface. One specific example of the breakpoint information query interface is VSM(context)=popBreakPointContext (the device identifier, the user identifier, and the application program identifier).

In step 202, if the user starts a new application program, the current application program in step 203 is the newly started application program. The newly started application program calls the breakpoint information query interface to report the query parameter to the breakpoint information manager. If the user starts the quit application program, or continues playing the suspended application program, the current application program in step 203 is the quit or suspended application program. The quit or suspended application program calls the breakpoint information query interface to report the query parameter to the breakpoint information manager.

Step 204: The breakpoint information manager obtains, according to the query parameter obtained from the current application program and stored breakpoint information of at least one application program, breakpoint context information corresponding to the query parameter.

In this step, the breakpoint information manager queries the stored breakpoint information according to the query parameter to obtain the breakpoint context information corresponding to the parameter.

Step 205: The breakpoint information manager judges, according to the query parameter, whether the user restarts the quit application or resumes playing of the suspended application program. If the user restarts the quit application program or resumes playing of the suspended application program, step 211 is performed; otherwise, step 221 is performed.

In this step, the breakpoint information manager makes a judgment according to the obtained query parameter. If information such as the device identifier, the user identifier, and the application program identifier in the query parameter is the same as the corresponding information in the breakpoint information obtained by using manner 1 or manner 2 in step 201, the user restarts the quit application program, or resumes playing of the suspended application program. For example, in step 201, the user presses a pause key during music playing, and the breakpoint information manager stores the breakpoint information. In step 202, the user resumes music playing. In step 203, the breakpoint information manager obtains the query parameter reported by the music player application program by calling the breakpoint information query interface. In step 204, the breakpoint information manager makes a judgment according to the device identifier, the user identifier, and the application program identifier in the query parameter, and knows that the user resumes playing the suspended application program. In this case, the breakpoint information manager performs a breakpoint resumption operation for the user, and specifically performs step 211. If information such as the device identifier, the user identifier, and the application program identifier in the query parameter is different from the corresponding information in the breakpoint information obtained by using manner 1 or manner 2 in step 201, the user starts a new application program, instead of continuing using the previously suspended or quit application program. In this case, the breakpoint information manager performs an interest information calculation operation for the user, and specifically performs step 221.

Step 211: The breakpoint information manager returns the breakpoint context information corresponding to the query parameter to the current application program.

In this step, the breakpoint information manager returns the breakpoint context information corresponding to the query parameter to the current application program. After obtaining the breakpoint context information, the current application program plays, from the position indicated by the breakpoint context information, the electronic file indicated by the breakpoint context information, thereby implementing breakpoint resumption.

Step 221: The breakpoint information manager calculates interest information according to the breakpoint context information.

In this step, the interest information is a set of keywords, extracted according to the breakpoint context, representing the user's interest. The keywords representing the user's interest are generally nouns, for example, person, place, time, article name, trademark, occupation, architecture style, school of music, movie and television product, and sports.

Specifically, the calculation of the interest information according to the breakpoint context information includes two steps: Step 1: Calculate temporary interest information according to the breakpoint context information. Step 2: Calculate the interest information according to the temporary interest information. The specific processes of the two steps are as follows:

Step 1: Calculate the temporary interest information according to the breakpoint context information. In step 1, the text of the breakpoint context information is represented by a vector, and feature items in the vector and their weights constitute the temporary interest information. Specifically, the breakpoint context information may be represented in the form of a vector by using a VSM. For example, the vector corresponding to the text of the breakpoint context information is (W1, W2, W3, ..., Wn), where Wi indicates the weight of the $i^{th}$ feature item, and i=1, 2, ..., n. The feature item may be a character, word, or phrase, where the feature item using a word enjoys a priority over the feature item using a character or phrase. Therefore, before the text of the breakpoint context information is represented as a vector in a vector space, a word split operation is firstly needed for the text of the breakpoint context information. The text of the breakpoint context information is represented by using words obtained by the word split operation as dimensions of the vector.

The weight of each of the feature items may be represented in the form of 0 or 1. To be specific, if a word occurs in the text of the breakpoint context information, the weight of the feature item corresponding to the word in the text vector of the breakpoint context information is 1; otherwise, if a word does not occur in the text of the breakpoint context information, the weight of the feature item corresponding to the word in the text vector of the breakpoint context information is 0.

The weight of each of the feature items may be represented in the form of a term frequency. Specifically, the term frequency may be an absolute term frequency or a relative term frequency. As regards the absolute term frequency, the occurrence frequency of a word in the text of the breakpoint context information is used to represent the weight of the feature item corresponding to the word in the text of the breakpoint context information. As regards the relative term frequency, a normalized term frequency of a word is used to represent the weight of the feature item corresponding to the word in the text of the breakpoint context information. The normalized term frequency may be calculated by using the term frequency-inverse document frequency (Term Frequency-Inverse Document Frequency, abbreviated as TF-IDF) formula. TF-IDF is a statistic method for evaluating importance of a character or word to a file set or a file in a language corpus. The importance of a character or word proportionally increases with increase of the occurrence frequency of the word in a file, and meanwhile proportionally decreases with increase of the occurrence frequency of the word in a language corpus. The following uses the case where the TF-IDF method is applied to breakpoint information of an electronic book as an example. The method for calculating a term frequency (Term Frequency, abbreviated to TF) is dividing the number of occurrences of a word on the current breakpoint page by the total number of words on the current breakpoint page. For example, if the current page contains totally 100 words and the word "Ranwu Lake" occurs for 10 times, the term frequency of the word "Ranwu Lake" on the breakpoint page is 10/100=0.1. The method for calculating a document frequency (Document Frequency, abbreviated as DF) is dividing the number of pages where a word occurs by the total number of pages contained in an electronic book. The method for calculating an inverse document frequency is: the inverse document frequency=ln(the total number of pages contained in an electronic book/the number of pages where a word occurs). For example, if the word "Ranwu Lake" occurs on 1,000 pages and the total number of pages contained in an electronic book is 10,000,000, the inverse document frequency is ln(10,000,000/1,000)=9.21. The calculated TF-IDF score of the word "Ranwu Lake" is 0.1×9.21=0.92.

In step 1, an operation is performed for the breakpoint information of a plurality of application programs by using the above method to obtain temporary interest information of the plurality of application programs. Each piece of temporary interest information is a set of at least one keyword representing the user's interest.

Step 2: Calculate the interest information according to the temporary interest information. In step 2, a set operation is performed for the obtained temporary interest information of the at least one application program, and the operation result is used as the interest information. A specific algorithm may be set for the set operation as required, including: performing a union, difference, or intersection operation for the set corresponding to the temporary interest information. Each piece of temporary information is also a set of at least one keyword representing the user's interest.

Step 222: The breakpoint information manager returns the interest information to the current application program.

In this step, the breakpoint information manager returns the interest information obtained by calculation in step 221 to the current application program. After obtaining the interest information, the current application program queries the electronic files whose formats are supported by the application program and plays the electronic file related to the interest information. For example, in step 203, a picture application program calls the breakpoint information query interface; in step 221, the breakpoint information manager obtains the interest information "Ranwu Lake" by calculation according to the stored breakpoint information of a plurality of application programs, in step 222, the breakpoint information manager returns the interest information "Ranwu Lake" to the picture application program, and the picture application program obtains, by query according to the interest information, pictures related to "Ranwu Lake" that are stored in an electronic play device, and the picture application program plays the pictures related to "Ranwu Lake".

Based on the above technical solution, the breakpoint information manager may be set locally in an electronic play device, or set at a network serving end, or set locally in the electronic play device and at the network serving simultaneously.

Where the breakpoint information manager is set locally in the electronic play device, the query parameter may include only application program identifiers for differentiating application programs in the electronic play device. Further, considering the case where a plurality of users share the same electronic play device, the query parameter may further include user identifiers for differentiating users using the electronic play device. In this case, the query parameter may include the device identifier or may not include the device identifier. If the device identifier is included, the device identifier is set to a fixed value.

In addition to the case where the breakpoint information manager is set locally in the electronic play device, the breakpoint information manager may also be set at a network serving end. For example, in an intelligent appliance network, electronic play devices such as televisions, speakers, computers, and electronic photo albums are interconnected over a network where a network serving end is deployed. When the breakpoint information manager is set at the network serving end, breakpoint information of a plurality of application programs in one electronic play device can be managed, and additionally breakpoint information across the electronic play devices can be managed. As regards the case where the breakpoint information manager is set at the network serving end, the query parameter includes the device identifier and the application program identifier. The device identifiers are used to differentiate electronic devices in the network. The application program identifiers are used to differentiate application programs. Further, the query parameter may further include user identifiers for differentiating users.

Or, the breakpoint information manager may be set locally in the electronic play device and at the network serving end simultaneously. In this case, the electronic play device and the network serving end both perform a synchronization operation periodically to update their stored breakpoint information. As regards the case where the breakpoint information manager is set locally in the electronic play device and at the network serving end simultaneously, a breakpoint may be queried from the breakpoint information manager set locally in the electronic play device or at the network serving end. The query parameter includes at least the device identifier and the application program identifier, and may further include the user identifier. Correspondingly, one specific implementation manner of a specific parameter of the breakpoint information query interface is as follows. The user identifier may be defaulted to a user identifier for logging in to the current network system, and may be written by the network system. When breakpoint information is queried locally in the electronic play device, the device identifier may be "local"; and when breakpoint information is queried at the serving end, the device identifier may be the device identifier of a device in the network. When breakpoint information of a current application program needs to be queried, the application program identifier may be "this"; and when breakpoint information of all application programs needs to be queried, the application program identifier may be "*". When the device identifiers, the user identifiers, and the application program identifiers are respectively the same, the breakpoint information manager implements the breakpoint resumption process. One common specific embodiment is that an electronic book application program resumes the playing from the breakpoint when the application program is suspended or quit. If the device identifiers are different, but the user identifiers and application program identifiers are respectively the same, the breakpoint information manager may implement cross-device breakpoint information management.

In the second embodiment of the present invention, after the breakpoint information of at least one application program is obtained, the corresponding breakpoint context is obtained from the breakpoint information according to the query parameter; if the user restarts a quit application program or resumes playing of a suspended application program, the breakpoint context information corresponding to the query parameter is played for breakpoint resumption; if the user does not restart the quit application program or resume playing of the suspended application program, the interest information is calculated according to the breakpoint context, and the corresponding electronic file is played according to the interest information. Hence the breakpoint information is deeply analyzed and reused; and breakpoint resumption is implemented according to an application program started by the user, or electronic files satisfying the user's interest characteristics are played for the user, thereby enlarging the application scope of the breakpoint information.

Figure 3:
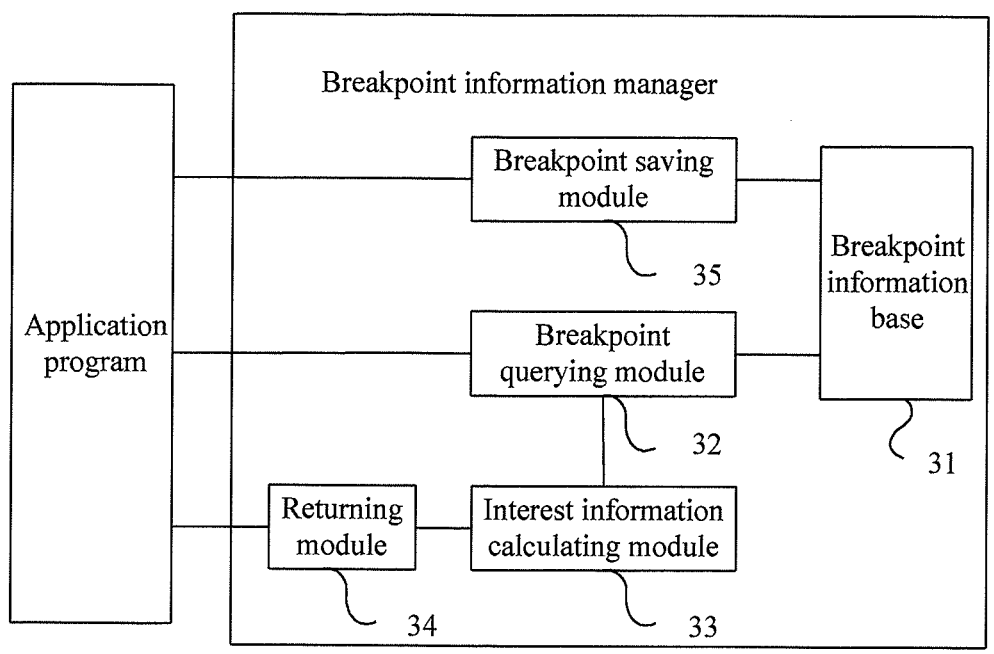
FIG. 3 is a schematic structural diagram of a breakpoint information manager according to a third embodiment of the present invention.

FIG. 3 is a schematic structural diagram of a breakpoint information manager according to a third embodiment of the present invention. As shown in FIG. 3, the breakpoint information manager includes: a breakpoint information base 31, a breakpoint querying module 32, an interest information calculating module 33, and a returning module 34.

The breakpoint information base 31 is configured to store breakpoint information of at least one application program. The breakpoint querying module 32 is configured to obtain, according to an obtained query parameter and the breakpoint information of at least one application program stored in the breakpoint information base 31, breakpoint context information corresponding to the query parameter. The interest information calculating module 33 is configured to calculate interest information according to the breakpoint context information. The returning module 34 is configured to return the interest information to the current application program so that the current application program plays a corresponding electronic file.

Based on the above technical solution, the breakpoint information manager further includes a breakpoint saving module 35. The breakpoint saving module 35 includes a breakpoint information saving interface, and is connected to the at least one application program by using the breakpoint information saving interface, and configured to obtain breakpoint information reported by the at least one application program by calling the breakpoint information saving interface when the at least one application program is suspended or quit, and store the breakpoint information to the breakpoint information base 31. Or, the breakpoint saving module 35 includes a screen-capture operation interface, and is connected to the at least one application program by using the screen-capture operation interface, and configured to: capture, when monitoring that the at least one application program is suspended or quit, screen page information by using the screen-capture operation interface, obtain breakpoint information of the at least one application program according to the screen page information, and store the breakpoint information to the breakpoint information base 31. Or, the breakpoint saving module 35 is configured to: obtain breakpoint information of the at least one application program from a storage device, and store the breakpoint information to the breakpoint information base 31.

Based on the above technical solution, specifically the breakpoint querying module 32 includes a breakpoint information query interface, and is connected to the current application program by using the breakpoint information query interface, and configured to obtain a query parameter reported by the current application program by calling the breakpoint information query interface.

Based on the above technical solution, specifically the breakpoint information saving interface and the breakpoint information query interface are application programming interfaces APIs.

Based on the above technical solution, specifically the interest information calculating module 33 is configured to: represent the breakpoint context information in the form of a vector by using a VSM to obtain temporary interest information, and perform a set operation for the temporary interest information to obtain the interest information.

For details about the functions and executed operations of the breakpoint saving module 35, the breakpoint information base 31, the breakpoint querying module 32, the interest information calculating module 33, and the returning module 34 in the breakpoint information manager, reference may be made to disclosure of the first and second embodiments of the present invention.

In the third embodiment of the present invention, the breakpoint information base stores the breakpoint information of at least one application program; the breakpoint querying module obtains the query parameter from the current application program and obtains the corresponding breakpoint context from the breakpoint information base according to the query parameter; the interest information calculating module calculates the interest information according to the breakpoint context; the returning module returns the interest information to the current application program; and the current application program plays the electronic file corresponding to the interest information. Hence the breakpoint information is deeply analyzed and reused; and electronic files satisfying the user's interest characteristics are played for the user, thereby enlarging the application scope of the breakpoint information.

It should be noted that, for brevity, the foregoing method embodiments are presented as a series of actions. But persons skilled in the art should understand that the present invention is not limited to the order of the described actions, because according to the present invention, some steps may adopt other order or occur simultaneously. It should be further understood by persons skilled in the art that the described embodiments all belong to exemplary embodiments, and the involved actions and modules are not necessarily required by the present invention.

In the foregoing embodiments, the description of each of the embodiments has respective focuses. For a part that is not described in detail in a certain embodiment, reference may be made to related descriptions in other embodiments.

Persons of ordinary skill in the art may understand that all or part of the steps of the methods in the embodiments may be implemented by a program instructing relevant hardware. The program may be stored in a computer readable storage medium. When the program is run, the steps of the methods in the embodiments are performed. The storage medium may be any medium capable of storing program codes, such as a ROM, a RAM, a magnetic disk, or an optical disk.

Finally, should be noted that the above embodiments are merely intended for describing the technical solutions of the present invention other than limiting the present invention. Although the present invention is described in detail with reference to the foregoing embodiments, persons of ordinary skill in the art should understand that they may still make modifications to the technical solution described in the foregoing embodiments or make equivalent substitutions to some technical features thereof, without departing from the spirit and scope of the technical solution of the embodiments of the present invention.

What is claimed is:

1. A breakpoint information management method, comprising:
obtaining, according to a query parameter obtained from a current application program and stored breakpoint information of at least one application program, breakpoint context information corresponding to the query parameter;
calculating interest information according to the breakpoint context information by:
representing the breakpoint context information in a form of a vector by using a vector space model (VSM) to obtain temporary interest information; and
performing a set operation for the temporary interest information to obtain the interest information;
returning the interest information to the current application program so that the current application program plays a corresponding electronic file;
wherein before obtaining, according to a query parameter obtained from a current application program and stored breakpoint information of at least one application program, breakpoint context information corresponding to the query parameter, the method further comprises:
obtaining and storing breakpoint information reported by the at least one application program by calling a breakpoint information saving interface when the at least one application program is suspended or quit; or
when monitoring that the at least one application program is suspended or quit, detecting screen page information by using a screen-capture operation interface, and obtaining and storing breakpoint information of the at least one application program according to the screen page information; or
obtaining and storing breakpoint information of the at least one application program from a storage device;
obtaining a query parameter reported by the current application program by calling a breakpoint information query interface; and
wherein the breakpoint information saving interface and the breakpoint information query interface are application programming interfaces APIs.

2. The method according to claim 1, wherein
the breakpoint information comprises the breakpoint context information, and further comprises at least one of a device identifier, a user identifier, or an application program identifier; and
the query parameter comprises at least one of the device identifier, the user identifier, or the application program identifier.

3. The method according to claim 1 wherein the breakpoint context information is selected from the set of: text content, network connection, network quality of services (QoS), and network configuration.

4. The method according to claim 1 wherein the interest information is a set of keywords extracted according to the breakpoint context information representing as a function of the query parameter.

5. A non-transitory computer readable medium embodying a computer program, the computer program comprising computer readable program code for:

instructing a breakpoint information base, configured to store breakpoint information of at least one application program;
instructing a breakpoint querying module, configured to obtain, according to a query parameter obtained from a current application program and stored breakpoint information of at least one application program, breakpoint context information corresponding to the query parameter;
instructing an interest information calculating module, configured to calculate interest information according to the breakpoint context information;
instructing a returning module, configured to return the interest information to the current application program so that the current application program plays a corresponding electronic file, wherein the interest information calculating module is configured to: represent the breakpoint context information in a form of a vector by using a vector space model (VSM) to obtain temporary interest information, and perform a set operation for the temporary interest information to obtain the interest information;
instructing a breakpoint saving module; wherein,
the breakpoint saving module is connected to the at least one application program by using a breakpoint information saving interface, and configured to: obtain breakpoint information reported by the at least one application program by calling the breakpoint information saving interface when the at least one application program is suspended or quit, and store the breakpoint information to the breakpoint information base; or
the breakpoint saving module is connected to the at least one application program by using a screen-capture operation interface, and configured to: capture, when monitoring that the at least one application program is suspended or quit, screen page information by using the screen-capture operation interface, obtain breakpoint information of the at least one application program according to the screen page information, and store the breakpoint information to the breakpoint information base; or
the breakpoint saving module is configured to: obtain breakpoint information of the at least one application program from a storage device, and store the breakpoint information to the breakpoint information base;
wherein the breakpoint querying module is connected to the current application program by using a breakpoint information query interface, and configured to obtain a query parameter reported by the current application program by calling the breakpoint information query interface; and
wherein the breakpoint information saving interface and the breakpoint information query interface are application programming interfaces APIs.

6. The non-transitory computer readable medium according to claim 5, wherein the breakpoint context information is selected from the set of: text content, network connection, network quality of services (QoS), and network configuration.

7. The non-transitory computer readable medium according to claim 5, wherein the interest information is a set of keywords extracted according to the breakpoint context information representing as a function of the query parameter.

* * * * *